(12) United States Patent
Basu et al.

(10) Patent No.: US 12,432,462 B2
(45) Date of Patent: Sep. 30, 2025

(54) LARGE DEPTH OF FIELD CAMERA WITH ADJUSTABLE IMAGE SENSOR ARRAY

(71) Applicant: Adeia Imaging LLC, San Jose, CA (US)

(72) Inventors: Anup Basu, Saint Albert (CA); Ning Xu, Irvine, CA (US)

(73) Assignee: Adeia Imaging LLC, San Jose, CA (US)

(*) Notice: Subject to any disclaimer, the term of this patent is extended or adjusted under 35 U.S.C. 154(b) by 140 days.

(21) Appl. No.: 18/515,643

(22) Filed: Nov. 21, 2023

(65) Prior Publication Data

US 2025/0168523 A1 May 22, 2025

(51) Int. Cl.
*H04N 23/959* (2023.01)
*H04N 23/54* (2023.01)
*H04N 23/67* (2023.01)
*H04N 25/47* (2023.01)

(52) U.S. Cl.
CPC .......... *H04N 23/959* (2023.01); *H04N 23/54* (2023.01); *H04N 23/67* (2023.01); *H04N 25/47* (2023.01)

(58) Field of Classification Search
CPC ...... H04N 23/959; H04N 23/54; H04N 23/67; H04N 25/47
See application file for complete search history.

(56) References Cited

U.S. PATENT DOCUMENTS

| | | | | |
|---|---|---|---|---|
| 10,606,152 B2* | 3/2020 | Wippermann | ......... | G03B 17/00 |
| 2013/0222676 A1* | 8/2013 | Ono | ......... | G03B 13/32 |
| | | | | 348/345 |
| 2013/0242161 A1* | 9/2013 | Kobayashi | ......... | H04N 23/957 |
| | | | | 348/340 |
| 2016/0296181 A1* | 10/2016 | Abkai | ......... | G06T 11/005 |
| 2018/0324334 A1* | 11/2018 | Wippermann | ......... | H04N 23/54 |
| 2019/0104242 A1* | 4/2019 | Wippermann | ......... | H04N 23/67 |
| 2021/0014473 A1* | 1/2021 | Hua | ......... | G02B 27/0172 |
| 2024/0013752 A1* | 1/2024 | Hua | ......... | G09G 5/391 |
| 2024/0053516 A1* | 2/2024 | Lee | ......... | G02B 3/0043 |

OTHER PUBLICATIONS

"Research: Wavefront Shaping," [https://biophot.caltech.edu/research/wavefront-shaping on Feb. 6, 2024], 4 pages.
(Continued)

*Primary Examiner* — Padma Haliyur
(74) *Attorney, Agent, or Firm* — HALEY GUILIANO LLP

(57) ABSTRACT

Systems and methods are provided for a camera and use of a camera to capture image data from 3D scenes and thereby generate large depth of field visualizations. The camera includes an optical system configured to generate an image of the 3D scene, an image sensor array positioned to receive the image of the 3D scene and including a plurality of image sensor segments, and a plurality of extensible members, each extensible member coupled between one of the image sensor segments and a housing and configured to move each coupled image sensor segment parallel to an optical axis of the optical system. In the process, the image data generated by the camera is captured and analyzed by control circuitry, and further movements of the image sensor segments are based on the analyzed image data.

20 Claims, 6 Drawing Sheets

(56) References Cited

OTHER PUBLICATIONS

Deng, Y., et al., "A Voxel Graph CNN for Object Classification with Event Cameras," 2022 IEEE/CVF Conference on Computer Vision and Pattern Recognition (CVPR), 162-1171 (2022).

Ens, J., et al., "An investigation of methods for determining depth from focus." IEEE Transactions on pattern analysis and machine intelligence 15.2:97-108 (1993).

Gu, C., et al., "The spatio-temporal poisson point process: A simple model for the alignment of event camera data," In Proceedings of the IEEE/CVF International Conference on Computer Vision, 13495-13504 (2021).

He, W., et al., "TimeReplayer: Unlocking the potential of event cameras for video interpolation," In Proceedings of the IEEE/CVF Conference on Computer Vision and Pattern Recognition, 17804-17813 (2022).

Hidalgo-Carrio, J., et al., "Event aided direct sparse odometry," Proceedings of the IEEE/CVF Conference on Computer Vision and Pattern Recognition, 5781-5790 (2022).

Pan, L., et al., "High frame rate video reconstruction based on an event camera," IEEE Transactions on Pattern Analysis and Machine Intelligence, 44(5):2519-2533 (2020).

Peng, X., et al., "Globally-optimal contrast maximisation for event cameras," IEEE Transactions on Pattern Analysis and Machine Intelligence, 44(7):3479-3495 (2021).

Rebecq, H., et al., "High speed and high dynamic range video with an event camera," IEEE Transactions on Pattern Analysis and Machine Intelligence, 43(6):1964-1980 (2019).

Subbarao, M., et al., "Selecting the optimal focus measure for auto-focussing and depth-from-focus," IEEE Transaction on Pattern Analysis and Machine Intelligence, 864-870 (1998).

Suwajanakorn, S., et al., "Depth from focus with your mobile phone," CVPR conference, 3497-3506 (2015).

Wang, L., et al., "Joint framework for single image reconstruction and super-resolution with an event camera," IEEE Transactions on Pattern Analysis and Machine Intelligence, 44(11):7657-7673 (2021).

Zhou, Y., et al., "Event-based stereo visual odometry," IEEE Transactions on Robotics, 37(5):1433-1450 (2021).

\* cited by examiner

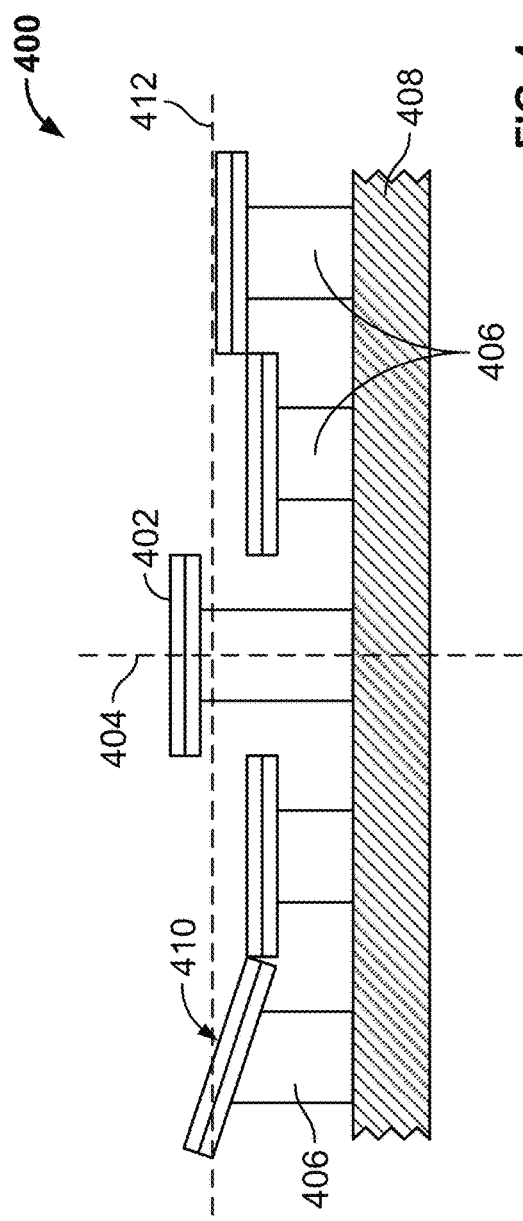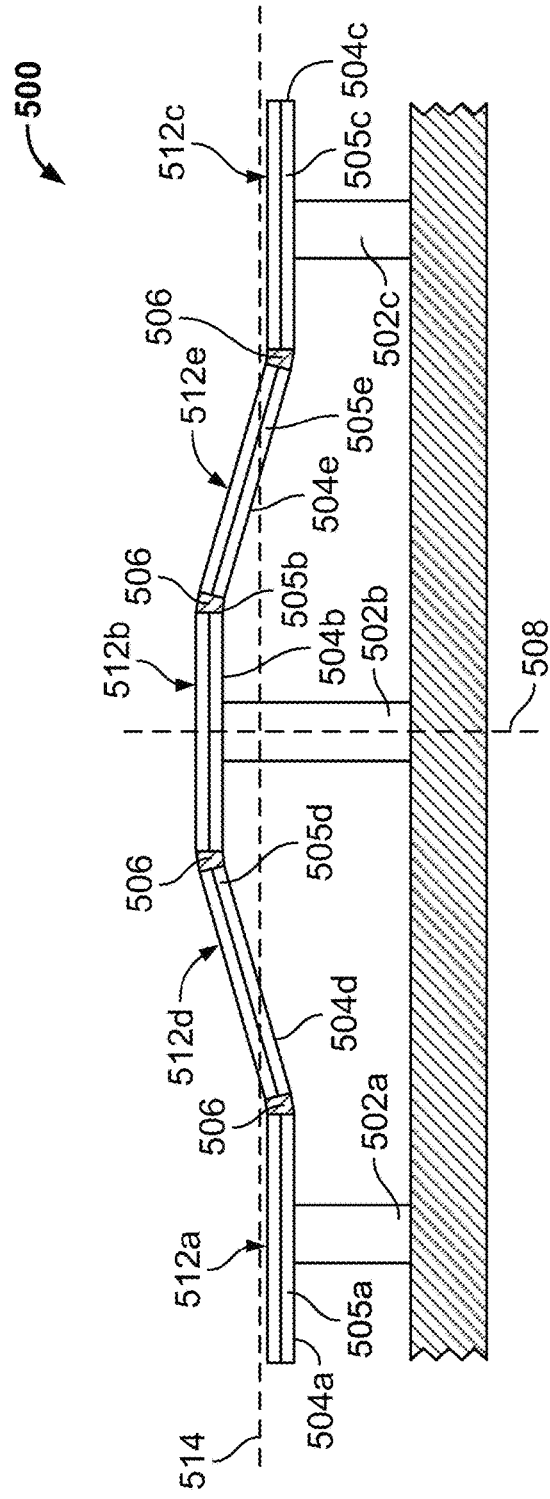

LARGE DEPTH OF FIELD CAMERA WITH ADJUSTABLE IMAGE SENSOR ARRAY

BACKGROUND

This disclosure is generally directed to systems and methods for generating large depth of field images, video, and three-dimensional (3D) models that are characterized by objects at different depths within a 3D scene to simultaneously be in focus. More particularly, systems and methods are provided herein that enable bringing multiple objects within a 3D scene simultaneously into focus when capturing image data for the 3D scene. Such image data may then be used for generating images, video, and/or 3D models with a large depth of field based on the 3D scene.

SUMMARY

Cameras are everywhere today, come in many different forms, and have many different uses. Cameras are regularly found in homes, offices, and public spaces, often for security, on and in cars, and incorporated into smartphones, computers, and other personal devices, among many other places. Cameras also have uses ranging from personal uses to business uses and everything in between. Even with the development of more modern camera technologies, such as event cameras, many uses of cameras, regardless of the type of camera, would generally benefit from an increased depth of field. One traditional approach of increasing the depth of field relies on decreasing the aperture size of the camera. While this method can work well in circumstances with bright light conditions, it often gives unsatisfactory results in circumstances with medium or low light conditions. Another approach that may be used to increase the depth of field relies on increasing a time interval for capturing an image. While this approach can work well for static scenes, moving objects within a scene can become blurred. This approach, therefore, is not well-suited for many practical applications.

In view of the shortcomings of existing cameras for capturing images with an increased depth of field, a need exists for improved cameras that may be used to generate images, video, and/or 3D models having a large depth of field. Accordingly, the systems and methods disclosed herein provide for a camera that includes an adjustable image sensor array that enables bringing multiple objects within a 3D scene simultaneously into focus when capturing image data for the 3D scene. Images, video, and/or 3D models having a large depth of field may be generated based on the captured image data.

As discussed in greater detail below, the systems and methods presented herein enable capturing image data with a large depth of field from a 3D scene. In some embodiments, the system is a camera with an optical system that generates an image of a 3D scene, an image sensor array that includes a plurality of image sensor segments and is positioned to receive the image of the 3D scene, and a plurality of extensible members. Each extensible member is coupled to one of the image sensor segments, and each extensible member may move the associated image sensor segment parallel to the optical axis of the optical system. By moving one of the image sensor segments with respect to the other image sensor segments, the camera enables the moved image sensor segment to bring a different depth of the 3D scene into focus as compared to the rest of the image sensor segments that were not moved. Moreover, each image sensor segment coupled to an extensible member may be moved to capture different depths of the 3D scene, and image data for these different depths within the 3D scene may all be captured simultaneously. The captured image data may then be used to generate an image, video, and/or 3D model having a large depth of field.

In some embodiments presented herein, the method enables capturing image data from a 3D scene using an optical system optically coupled to an image sensor array having a plurality of image sensor segments, analyzing the image data, and moving at least one image sensor segment parallel to an optical axis of the optical system in response to the analyzed image data. In some embodiments, analyzing the image data may include analyzing the image data from at least one image sensor segment for an estimate of focus. This process enables bringing multiple objects within a 3D scene simultaneously into focus when capturing image data for the 3D scene. Images, video, and/or 3D models having a large depth of field may be generated based on the captured image data.

In some embodiments, the image sensor array may be configured as an event sensor and included in an event camera. In such embodiments, each image sensor segment of the image sensor array generates image data as event data, which corresponds to local changes in brightness within the 3D scene as detected by individual pixel sensors of each image sensor segment. Image data from such an image sensor array is captured and may be used to generate an image, video, or 3D model of the 3D scene.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale. The figures include:

FIG. 4 illustrates a side view of a second example of an adjustable image sensor array;

FIG. 5 illustrates a side view of a third example of an adjustable image sensor array;

DETAILED DESCRIPTION

Figure 1:
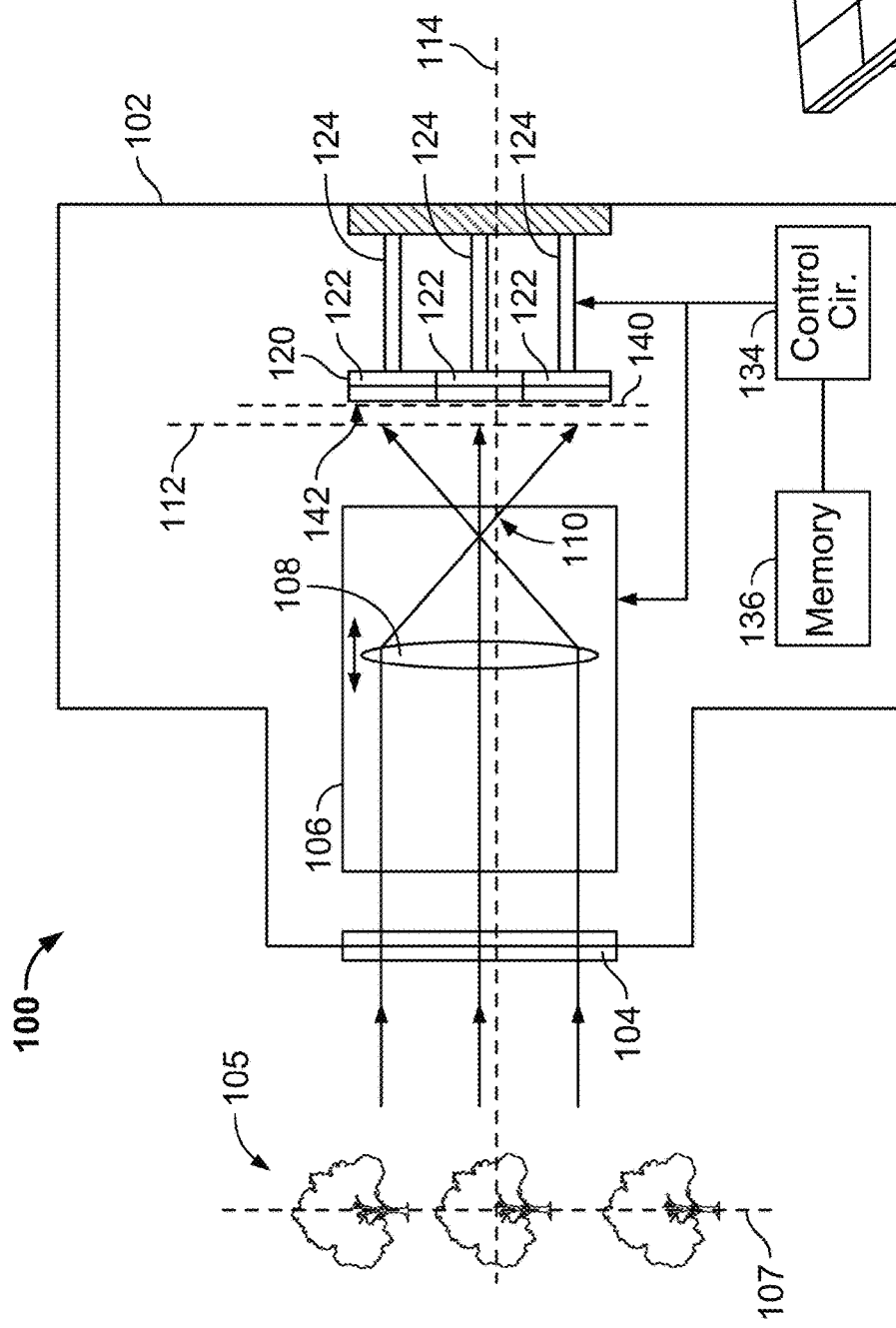
FIG. 1 schematically illustrates an example of a camera with an adjustable image sensor array.

Turning in detail to the drawings, FIG. 1 schematically illustrates an example of a camera 100 that includes an adjustable image sensor array. The camera 100 is shown in the form of a traditional handheld personal digital camera.

The components of the camera 100 may be incorporated into any desirable form that functions as a camera, i.e., capturing image data for purposes of generating content that includes visualizations such as 2D/3D images, 2D/3D video, and/or 3D models. For example, the camera 100 may be a security camera that is mounted to a surface, a body-mounted camera, a submersible camera, a vehicle mounted camera (such as might be found on a police car), a smart phone camera, and a computer camera, among others. The camera 100 is not to be limited based on the form factor or the circumstances of use.

The camera 100 includes a housing 102 and an entrance window 104 through which light from a scene 105 enters the housing 102. Light entering through the entrance window 104 passes into the optical system 106. In some embodiments, the entrance window 104 is a panel that is translucent to light in the operational spectrum of the camera and has planar front and back sides. With such an arrangement, light that has orthogonal incidence to the front side of the entrance window 104 is not refracted by either the front side or the back side prior to entering the optical system 106. In some embodiments, the entrance window 104 is incorporated as part of the optical system 106 and may be one of a plurality of lenses that function to focus light passing through the optical system 106.

The optical system 106 includes at least one lens 108 and is configured to generate an image of the scene 105 at a focal plane 112, the scene 105 being on the opposite side of the entrance window 104 from the optical system 106. As is understood in the art of cameras, those objects within the plane of focus 107 of the optical system 106 are in sharpest focus within the image formed at the focal plane 112, and as the lens 108 is moved, the focal length changes so that both the plane of focus 107 and the focal plane 112 move along the optical axis 114. The relationship between movement of a lens within an optical system and the resulting movement of the plane of focus and the focal plane is dependent upon the design specifics of the optical system and is well understood in the art of camera lenses. The optical system 106 also includes an aperture 110 for purposes of increasing or decreasing the amount of light that is used to form the image at the focal plane 112 of the optical system 106. For purposes of clarity, the optical system 106 is shown with the representative lens 108. However, it will be understood that the optical system 106 may include any number of lenses to accommodate the intended use of the camera 106 so that focus, or a range of focus, may be obtained for a desired scene at a desired distance. For example, the optical system 106 may be configured as a telephoto lens system for capturing a scene from a distance. As another example, the optical system 106 may be configured as a macro lens system for capturing a close-up scene. Also, for purposes of clarity, the aperture 110 is shown at the output side of the optical system 106. However, it will be appreciated that the aperture 110 may be placed between lenses within the optical system 106 if multiple lenses are included in the optical system and such placement serves the design purposes of the optical system 106. The optical system 106 is also shown disposed entirely enclosed within the housing 102. As will be appreciated, in some embodiments the optical system 106 may be disposed partially inside the housing 102 and partially outside the housing 102. In some embodiments, the portions of the optical system 106 that are disposed outside of the housing 102 may be removable from the camera (e.g., a removable telephoto lens, a removable macro lens, and the like).

The lens 108 (or lenses) of the optical system 106 defines the optical axis 114 of the optical system 106, and the lens 108 is moveable along the optical axis 114 to adjust the position of the focal plane 112 of the optical system 106. In embodiments in which the optical system 106 includes a plurality of lenses, a subset of the lenses of the optical system 106 may be moved to the position of the focal plane 112 of the optical system 106. As the lens 108 moves along the optical axis 114, the focal plane 112 also moves along the optical axis 114. In some embodiments, typically those in which the optical system 106 includes a single lens 108, there will be a one-to-one correspondence between movement of the lens 108 and movement of the focal plane 112. In embodiments with more complex optical systems 106 having multiple lenses, the ratio between movement of the lens 108 and movement of the focal plane 112 may be other than one-to-one.

Figure 2:
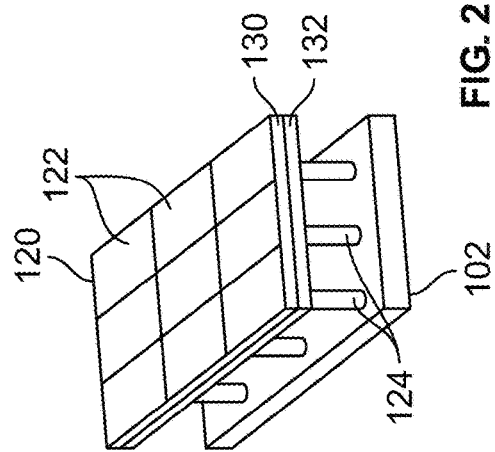
FIG. 2 illustrates a perspective view of a first image sensor array.

The camera 100 also includes an image sensor array 120 that is formed by a plurality of image sensor segments 122. FIG. 2 illustrates a perspective view of an example of the image sensor array 120. In this example, the image sensor array 120 includes nine image sensor segments 122 arranged in a 3×3 array pattern. In some embodiments, the images sensory array 120 may include more or fewer image sensor segments 122. In some embodiments, the image sensor array 120 may include image sensor segments 122 arranged in a pattern other than a square grid pattern. For example, in such embodiments the image sensor segments 122 may be arranged in a M×N array pattern, where M and N are whole numbers, and M>N. As another example, in such embodiments the image sensor segments 122 may be hexagonal in shape such that the image sensor array 120 is a hexagonal array. As another example, in such embodiments the image sensor array 120 may include image sensor segments 122 that vary in surface area size, surface area shape, or both. The configuration of the image sensor segments 122 forming the image sensor array 120, namely the size, shape, number, and arrangement of the image sensor segments 122, is not intended to be limiting on the scope of the disclosure.

Each image sensor segment 122 includes an image sensor 130 coupled to a backplane 132. The image sensor 130 is the light-sensitive element of the camera 100 that generates image data from incident light passing through the optical system 106. In embodiments that capture image data in the manner of traditional cameras, the image sensor 130 of each image sensor segment 122 may be a charge-coupled device (CCD), a complementary metal-oxide semiconductor (CMOS), or any other similar type of image sensor. In embodiments that capture event data in the manner of event cameras, the image sensor 130 of each image sensor segment 122 may be an event-based sensor, which is sometimes also referred to as a dynamic vision sensor or an event-based vision sensor.

The backplane 132 is coupled to one end of an extensible member 124, and the other end of each extensible member 124 is coupled to the housing 102. The camera 100 also includes control circuitry 134 communicably coupled to a memory 136, to each of the image sensor segments 122, and to the extensible members 124. The control circuitry 134 is configured to control the length of the extensible members 124. By controlling the length of the extensible members, the position of each image sensor segment 122 parallel to the optical axis 114 may be controlled during operation of the camera 100. As discussed in more detail below, the control circuitry 134 may analyze image data received from an image sensor segment 122 and adjust the position of that image sensor segment 122 in a direction parallel to the optical axis 114 of the optical system 106. To aid in positioning the image sensor segments 122 with respect to the lens 108, the image sensor array 120 has a predetermined reference plane 140 associated with it. In FIG. 1, the reference plane 140 is shown adjacent to and parallel with the focal plane 112 of the lens 108 for purposes of clarity. However, by moving each image sensor segment 122 toward the lens 108 using the extensible members 124, the reference plane 140 and the focal plane 112 would become coplanar. In some embodiments, the position of the reference plane 140 is predetermined and set to be coplanar with the imaging surface 142 of the image sensor array 120 when all the image sensor segments 122 are aligned, such that the imaging surface 142 is also planar, by having the extensible members 124 set in a default position. During use of the camera 100, this default position of the imaging sensor array 120 may be used in combination with a default position for the lens 108 to place the reference plane 140 coplanar with the focal plane 112. In some embodiments, having such a default position for both the lens 108 and the image sensor array 120 may simplify some analyses performed by the control circuitry 134 during use of the camera 100, particularly once the lens 108 is moved for focusing on the scene 105 and the individual image sensor segments 122 are moved to provide focus for individual objects within the scene 105. It should also be noted that with both the lens 108 and the image sensor array 120 in the default position, the camera 100 will essentially operate as a traditional camera with a fixed image sensor.

As shown, each extensible member 124 is a telescopic rod. In some embodiments, each extensible member may be a micro-electromechanical system (MEMS) component, a micro piezoelectric component, and/or other types of electromechanical components. Each extensible member 124 is configured to translate the respectively coupled image sensor segment 122 in a direction parallel to the optical axis 114 of the optical system 106. In some embodiments, the one or more of the extensible members 124 may be additionally configured to move the respective image sensor segment 122 in tilt. In some embodiments, adjustments to the extensible members 124 may be controlled manually via user input to the control circuitry 134 via user input interface (not shown). In some embodiments, adjustments to the extensible members 124 may be controlled algorithmically via the control circuitry 134. In some embodiments, both manual and algorithmic control may be incorporated into the camera 100 via user-accessible controls. Such controls may be in the form of hardware buttons, toggles, and the like. Alternatively, or in addition, such controls may be incorporated into a touch-sensitive display included as part of the camera 100.

The control circuitry 134 may be based on any suitable control circuitry and includes control circuits and memory circuits, which may be disposed on a single integrated circuit or may be discrete components. As referred to herein, control circuitry should be understood to mean circuitry based on at least one of microprocessors, microcontrollers, digital signal processors, programmable logic devices, field-programmable gate arrays (FPGAs), or application-specific integrated circuits (ASICs), etc., and may include a multi-core processor (e.g., dual-core, quad-core, hexa-core, or any suitable number of cores). In some embodiments, the control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry may be implemented in hardware, firmware, or software, or a combination thereof.

The memory 136 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 8D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. The memory 1010 may be used to store several types of content, metadata, and/or other types of data. Non-volatile memory may also be used (e.g., to launch a boot-up routine and other instructions). Cloud-based electronic storage may be used to supplement the memory 136.

Although not shown, the camera 100 may also include a display screen, a communications interface, and input/output circuitry. The display screen may be any type of display screen that is suitable for use with a camera. Such display screens may include LED screens, OLED screens, and the like. The communications interface may include any type of communications circuitry that enables the camera 100 to communicate, either directly or indirectly, with other devices, servers, networks, and the like. Direct communications circuitry may include those that use protocols such as USB, Bluetooth, serial, and the like. Indirect communications circuitry may include those that use a network (e.g., a local area network (LAN) such as Wi-Fi, a wide area network (WAN) such as the Internet, and the like) interposed between devices. In some embodiments, the communications interface may be configured for communications using multiple different circuitry and protocols (e.g., Bluetooth, Wi-Fi, 5G, 4G, LTE, Ethernet, USB, etc.). In some embodiments, the communications interface may include multiple modules, with each module configured for communications using different circuitry and protocols.

Figure 3:
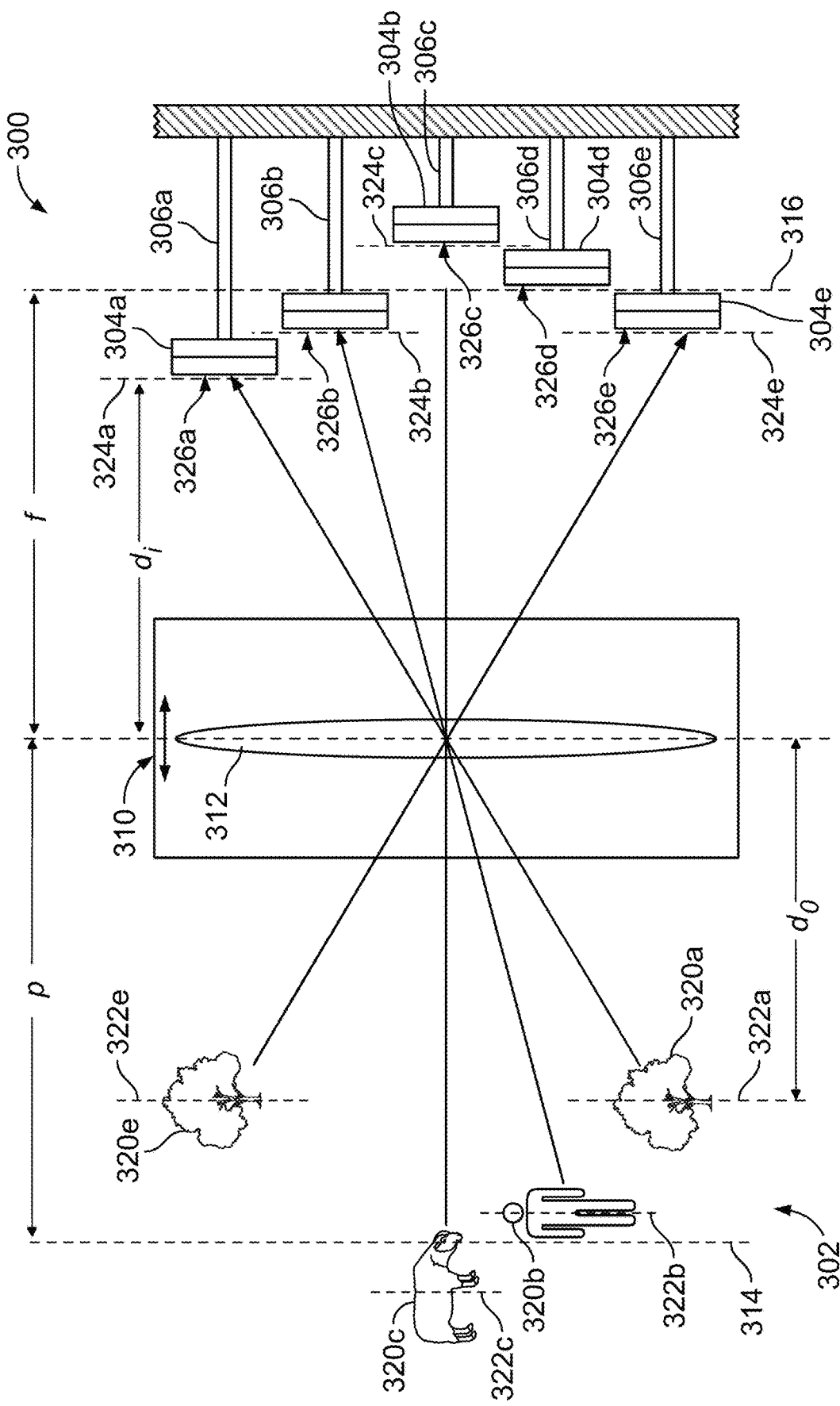
FIG. 3 illustrates a side view of a first example of an adjustable image sensor array.

FIG. 3 illustrates an example of an image sensor array 300 being used to generate image data of a 3D scene 302. For clarity, only a single row of the image sensor array 300 is depicted and described. It is to be understood that the image sensor array 300 may include additional rows of image sensor segments to enable image data to be captured for more of the 3D scene 302 than is depicted. The image sensor array 300 is shown with one or more of the image sensor segments 304a-e moved out of the default position. As shown, the image sensor array 300 includes five image sensor segments 304a-e, with an extensible member 306a-e coupled between each image sensor segment 304a-e, respectively, and the housing 308. In this example, each extensible member 306a-e may move each respective image sensor segment 304a-e independently of the other image sensor segments.

The optical system 310 defines an optical axis 311 and includes a lens 312 for focusing an image of the 3D scene 302 at each of the image sensor segments 304a-e. For purposes of clarity, the optical system 310 is shown with just the single lens 312. However, it will be understood that the optical system 310 may include any number of lenses to accommodate the intended use of the camera so that focus, or a range of focus, may be obtained for a desired scene at a desired distance. As shown, the lens 312 is positioned within the optical system 310 so that the primary plane of focus 314 within the 3D scene 302 is imaged at the focal plane 316. The primary plane of focus 314 is at a distance p from the lens 312, and the focal plane 316 is at a distance f from the lens. For purposes of this example, the focal plane 316 is coplanar with the plane of reference of the image sensor array 300, such that the focal plane 316 is placed at the default position of the image sensor array 300. The 3D scene 302 includes a plurality of objects 322a-c, 322e, each located at a different distance from the optical system 310, and none within the focal plane 316. The first object 320a is located at the first plane of focus 322a; the second object 320b is located at the second plane of focus 322b; the third object 320c is located at the third plane of focus 322c; and the fourth object 320e is located at the fourth plane of focus 322e. Thus, if image data were to be captured with the image sensor array 300 in the default position, then objects 322a-c, 322e may be somewhat out of focus in an image generated from the image data. Movement of individual segments of the image sensor array may be moved so that the objects are not out of focus.

When generating an image of an object, a lens generates the image inverted and on the opposite side of the optical axis from where the object is located. By way of example, an image of the first object 320a, which is positioned in the first plane of focus 322a within the 3D scene 302, is generated at the focal plane 324a on the opposite side of the optical axis 311. The plane of focus 322a is a distance $d_o$ from the lens, and the focal plane 324a is a distance $d_i$ from the lens. Similar distances are associated with the other planes of focus 322b-e and focal planes 324b-e. As explained in more detail below, the optical distances between objects 320a-e in the 3D scene 302 and the lens 312, and the optical distances between the lens 312 and the focal planes 324a-e, may be used to optimize the configuration of the image sensor array 300. The 3D scene 302 may be captured, with the objects 320a-c, 320e in sharp focus, by moving several of the image sensor segments 304a-e so that each is positioned at one of the focal planes 324a-c, 324e for capturing image data. To capture an in-focus image of the first object 320a, which is positioned at the first plane of focus 322a, the first image sensor segment 304a is moved by the first extensible member 306a to a position in which the sensor surface 326a of the first image sensor segment 304a is coplanar with the first focal plane 324a. To capture an in-focus image of the second object 320b, which is positioned at the second plane of focus 322b, the second image sensor segment 304b is moved by the second extensible member 306b to a position in which the sensor surface 326b of the second image sensor segment 304b is coplanar with the second focal plane 324b. To capture an in-focus image of the third object 320c, which is positioned at the third plane of focus 322c, the third image sensor segment 304c is moved by the third extensible member 306c to a position in which the sensor surface 326c of the third image sensor segment 304c is coplanar with the third focal plane 324c. The fourth image sensor segment 304d is not moved because there are no additional objects in the 3D scene that are directed onto the fourth image sensor segment 304d and in need of being in sharper focus. In addition, the sensor surface 326d of the fourth image sensor segment 304d is already positioned at the focal plane 316, and this position enables the fourth image sensor segment 304d to capture image data of the 3D scene 302 that are positioned in the plane of focus 314. To capture an in-focus image of the fourth object 320e, which is positioned at the plane of focus 322e, the fifth image sensor segment 304e is moved by the fifth extensible member 306e to a position in which the sensor surface 326e of the fifth image sensor segment 304e is coplanar with the fifth focal plane 324e. By moving the image sensor segments 304a-c, 304e to these positions, the objects 320a-c, 320e are placed in sharpest focus for the image sensor array 300 to capture image data of the 3D scene 302, thereby resulting in a larger depth of focus for any resulting visualizations generated from the image data.

FIG. 4 illustrates an example of an image sensor array 400 that enables the individual image sensor segments 402 to move parallel to the optical axis 404 of the optical system (not shown) and to move in tilt. The image sensor array 400 is shown with one or more of the image sensor segments 402 moved out of the default position. An extensible member 406 is coupled between one of the image sensor segments 402 and the housing 408. In some embodiments, the extensible members 406 of this example may each be a piezoelectric component that may expand and contract to move the respective image sensor segment 402 parallel to the optical axis 404 and may move the respective image sensor segment 402 in tilt. When an image sensor segment 402 is moved in tilt, the sensor surface 410 of the image sensor segment 402 is tilted so that it is not parallel to the reference plane 412 of the image sensor array 400. Being able to move an image sensor segment 402 in tilt may be advantageous for capturing image data for objects in the 3D scene when the objects extend significantly in front of or behind the plane of focus.

FIG. 5 illustrates an example of an image sensor array 500 for a camera that uses fewer extensible members 502a-c while still enabling the camera to capture a large depth of field. The image sensor array 500 is shown with one or more of the image sensor segments 504a-e moved out of the default position. The image sensor array 500 includes a plurality of image sensor segments 504a-e, and the backplane 505a-e of each image sensor segment 504a-e is coupled to the backplane 505a-e of each respective adjacent image sensor segment 504a-e by an elastomeric bonding material 506. The elastomeric bonding material 506 provides a compliant bond between the backplanes 505a-e of adjacent image sensor segments 504a-e and allows each image sensor segment 504a-c to move parallel to the optical axis 508 of the optical system (not shown in FIG. 5) without introducing significant stress to the image sensor segments 504a-e or to the elastomeric bonding material 506 itself. The thickness of the elastomeric bonding material 506 between the backplanes 505a-e of adjacent image sensor segments 504a-e may vary based on the design requirements for the image sensor array 500. The properties and thickness of the elastomeric bonding material 506 may be chosen such that no more than a negligible amount of added force, due to the elastomeric bonding material 506, is needed to move an image sensor segment 504a-e relative to respective adjacent image sensor segments 504a-e.

As shown in FIG. 5, image sensor segments 504a-c are coupled to extensible members 502a-c, and image sensor segments 504d-e are coupled to the respective adjacent image sensor segments 504a-c by the elastomeric coupling material 506. Image sensor segments 504d-e are not directly coupled to the extensible members 502a-c. Thus, image sensor segments 504a-c may be directly moved by the respective extensible member 502a-c, while image sensor segments 504d-e may be indirectly moved by movement of one or more of the extensible members 502a-c. The image sensor segments 504a-b are shown positioned with each respective sensor surface 512a-b coplanar with the reference plane 514. The image sensor segment 504b is shown positioned with sensor surface 512c parallel to, but not coplanar with, the reference plane 514. Because image sensor segments 504*d-e* are coupled between the image sensor segment 504*b* and respective adjacent image sensor segments 504*a*, 504*c*, the sensor surfaces 512*d-e* of each image sensor segment 504*d-e* are non-parallel with the reference plane 514 due to the elastomeric coupling material 506 and the difference in positions between the image sensor segment 504*b* and the image sensor segments 504*a*, 504*c*.

This configuration of the image sensor array 500 may provide an advantage in having fewer extensible members 502*a-c* involved in the design, thus potentially saving manufacturing costs. Although the image sensor array 500 is shown in FIG. 5 with every other image sensor segment 504*a-c* coupled to an extensible member 502*a-c*, in some embodiments, every third, fourth, or more image sensor segment may be coupled to an extensible member. Such a configuration may result in even greater manufacturing cost savings.

Figure 6:
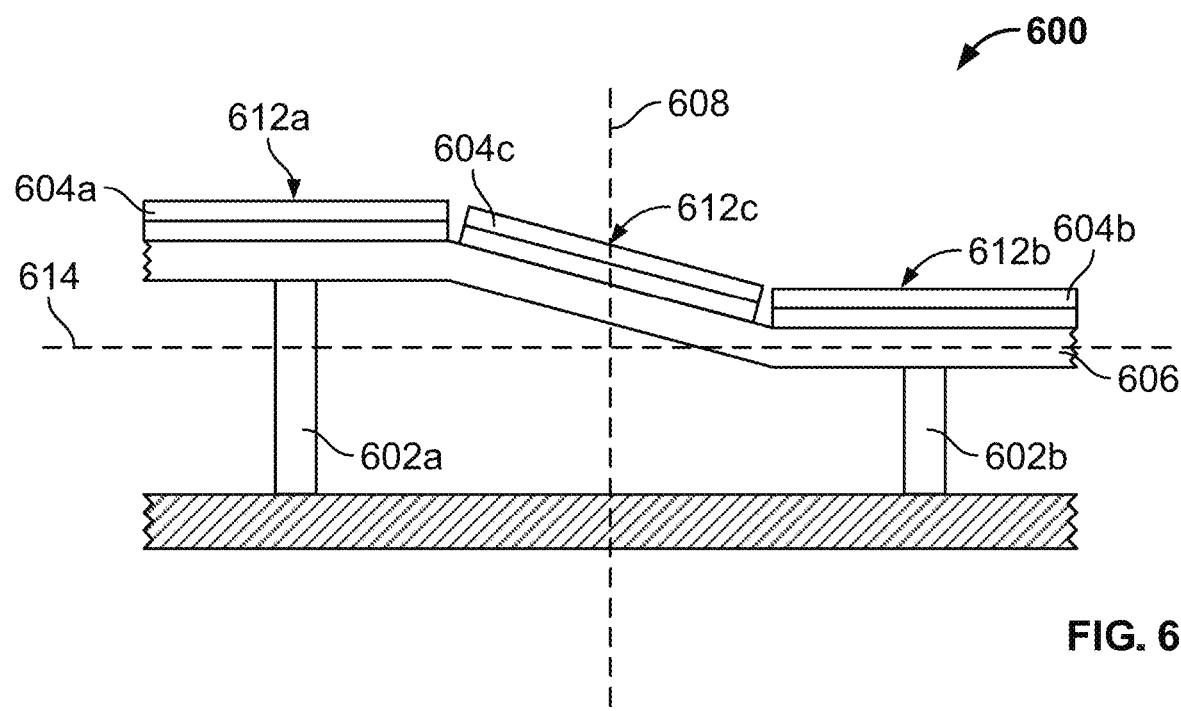
FIG. 6 illustrates a side view of a fourth example of an adjustable image sensor array.

FIG. 6 illustrates another example of an image sensor array 600 for a camera that uses fewer extensible members 602*a-b* while still enabling the camera to capture a large depth of field. The image sensor array 600 is shown with one or more of the image sensor segments 604*a-c* moved out of the default position. The image sensor array 600 includes a plurality of image sensor segments 604*a-c*, and each image sensor segment 604*a-c* is coupled to a flexible support surface 606. The flexible support surface 606 provides indirect coupling between adjacent image sensor segments 604*a-c* and allows each image sensor segment 604*a-b* to move parallel to the optical axis 608 of the optical system (not shown in FIG. 6) without introducing significant stress to the image sensor segments 604*a-c* or to the flexible support surface 606 itself. As shown, extensible members 602*a-b* are coupled to the flexible support surface 606 opposite image sensor segments 604*a-b*, respectively.

As shown in FIG. 6, image sensor segment 604*c* does not have an extensible member oppositely coupled to the flexible support surface 606. Thus, image sensor segments 604*a-b* may be directly moved by the respective extensible members 602*a-b*, while image sensor segment 604*c* may be indirectly moved by one or more of the extensible members 602*a-b*. The image sensor segments 604*a-b* are shown positioned with the sensor surfaces 612*a-b* parallel to, but not coplanar with, the reference plane 614. Because image sensor segment 604*c* is coupled between the image sensor segments 604*a-b*, the sensor surface 612*c* is non-parallel with the reference plane 614 due to the flexible support surface 606 and the difference in positions between the image sensor segment 604*a* and the image sensor segment 604*b*.

This configuration of the image sensor array 600 may provide an advantage in having fewer extensible members 602*a-b* involved in the design, thus potentially saving manufacturing costs. Although the image sensor array 600 is shown in FIG. 6 with every other image sensor segment 604*a-b* coupled to the flexible support surface 606 opposite an extensible member 602*a-b*, in some embodiments, every third, fourth, or more image sensor segment may be coupled to the flexible support surface 606 opposite an extensible member. Such a configuration may result in even greater manufacturing cost savings.

Figure 7:
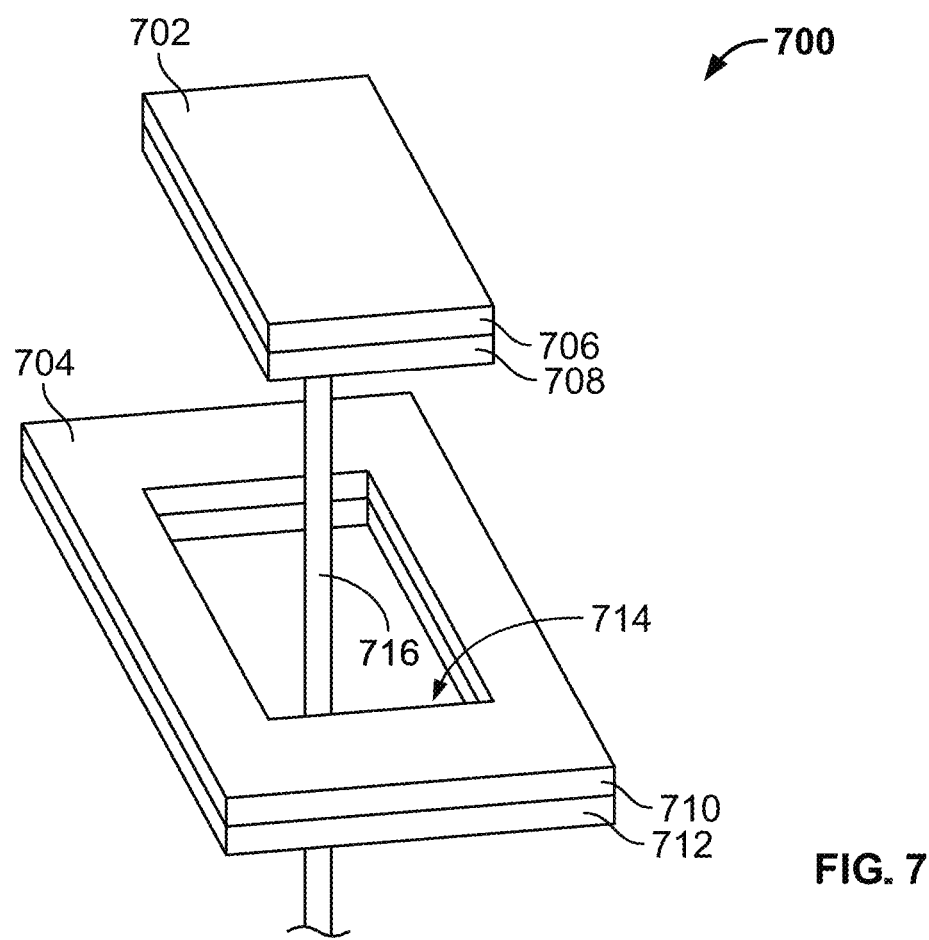
FIG. 7 illustrates a perspective view of an image sensor segment from an adjustable image sensor array.

FIG. 7 illustrates a dual-layered image sensor segment 700 that may be incorporated into an image sensor array with other similar image sensor segments. The dual-layered image sensor segment 700 includes an upper image sensor segment 702 and a lower image sensor segment 704. The upper image sensor segment 702 includes an image sensor 706 coupled to a backplane 708 and may be similar in shape as the image sensor segments described above with respect to FIG. 1. The lower image sensor segment 704 includes an image sensor 710 and a backplane 712, and when integrated into a camera, the backplane 712 of the lower image sensor segment 704 may be coupled to the camera housing (not shown in FIG. 7) so that the lower image sensor segment 704 remains stationary during use. In practice, the backplane 712 may be directly or indirectly coupled to the camera housing, depending upon the design of the camera. In some embodiments, the backplanes 712 of adjacent image sensor segments 700 may be coupled together or formed together as a single contiguous unit. The lower image sensor segment 704 is formed with a central open portion 714 through which an extensible member 716 extends between the upper image sensor segment 702 and the camera housing. The extensible member 716 is coupled to the backplane 708 of the upper image sensor segment 702 and controls movement of the upper image sensor segment 702 in any of the manners described herein. During use, the extensible member 716 moves the upper image sensor segment 702 while the lower image sensor segment 704 remains stationary. Thus, the upper image sensor segment 702 may function as described above for the image sensor segments shown in FIG. 3 and elsewhere herein. During use, the upper image sensor segment 702 may be moved to the focal plane of an object within the 3D scene, and since the lower image sensor segment 704 remains stationary, any light from the 3D scene that is not incident on the upper image sensor segment 702, or on any adjacent image sensor segments, may be incident on the lower image sensor segment 704 (or an adjacent lower image sensor segment). The lower image sensor segment 704, therefore, may be used to capture image data from light that is not incident on the upper image sensor segment 702. In some embodiments, the image data captured by the lower image sensor segment 704 may be used to enhance images generated of the 3D scene.

Figure 8:
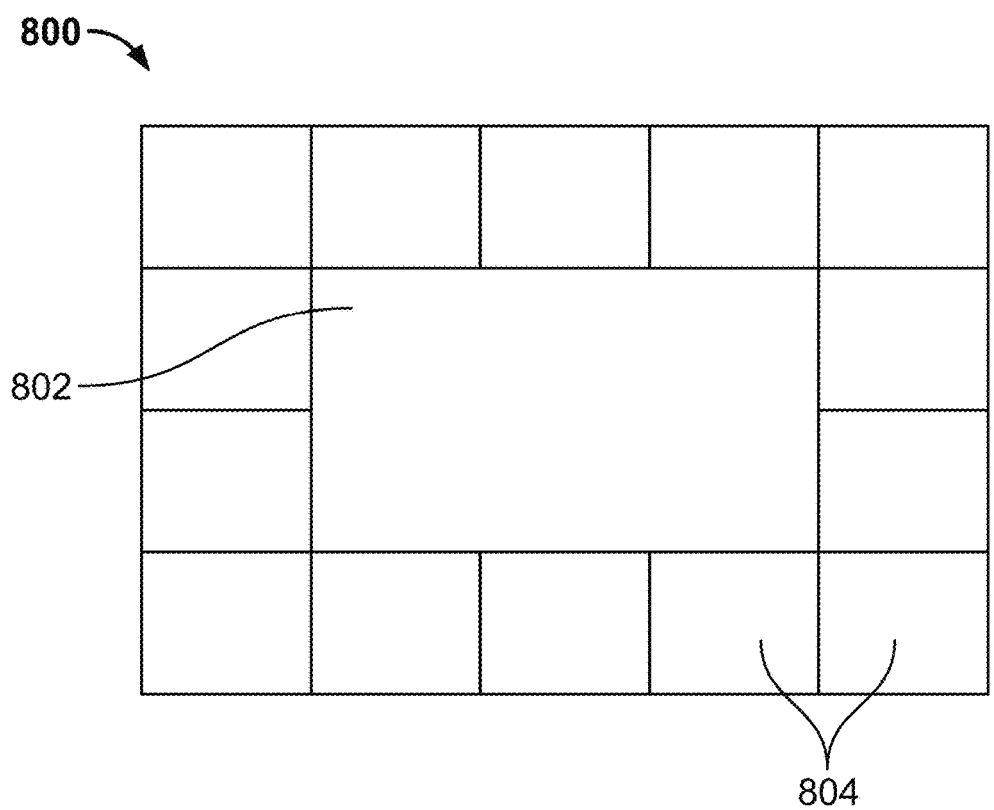
FIG. 8 illustrates a top plan view of a another example of an adjustable image sensor array.
Figure 9:
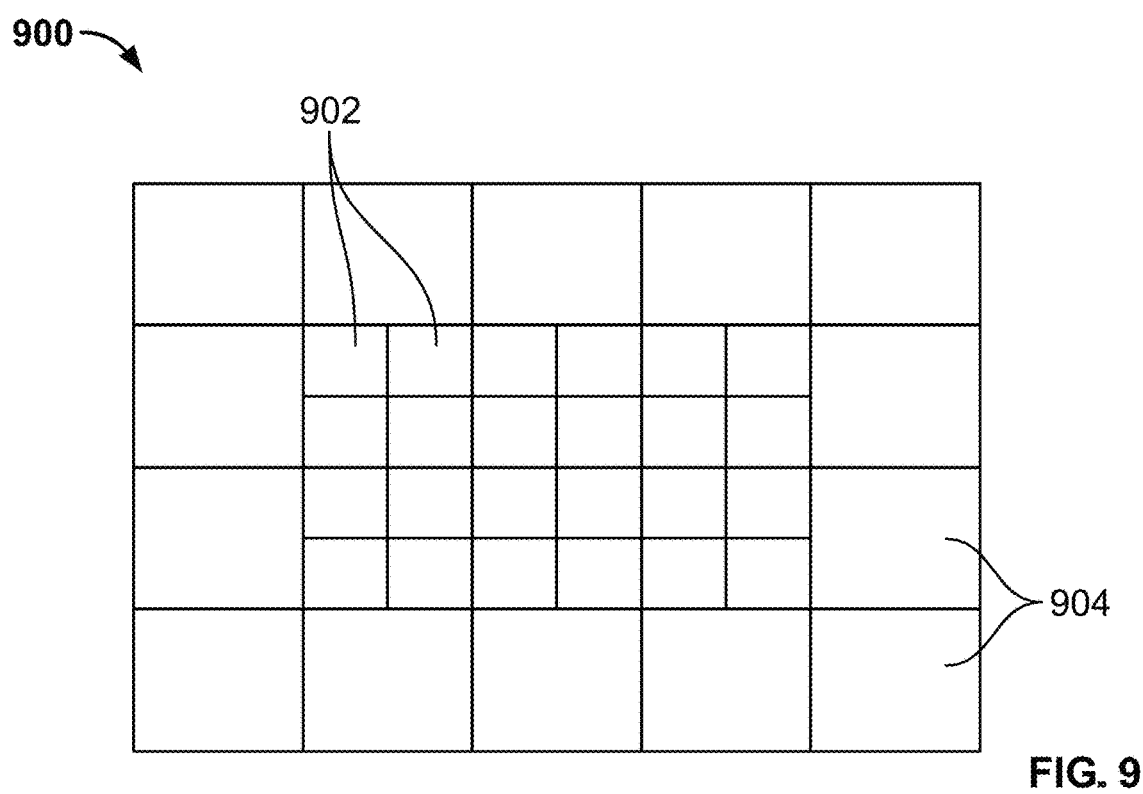
FIG. 9 illustrates a top plan view of a yet another example of an adjustable image sensor array.

A top plan view of an example image sensor array 800 is shown in FIG. 8. This image sensor array 800 includes a first image sensor segment 802 that has a different geometric surface shape as compared to a plurality of second image sensor segments 804. In some embodiments, the image sensor array 800 may include image sensor segments having more than two different geometric surface shapes. As shown, the first image sensor segment 802 is rectangular and positioned centrally within the image sensor array 800. In some embodiments, the first image sensor segment 802 may be positioned anywhere within the image sensor array 800, even at the outer edges. In some embodiments, more than one first image sensor segment 802 may be included in the image sensor array 800. During use, the first image sensor segment 802, when positioned in the center of the image sensor array 800, may be used to capture image data from a 3D scene that includes a central feature without extreme variations in depth. The second image sensor segments 804 are positioned around the first image sensor segment 802 within the image sensor array 800. During use, the second image sensor segments 802 may be used to capture image data from other objects in the 3D scene that are positioned around the central feature at varying depths. In some embodiments, the image sensor segments of an image sensor array may be formed having geometric shapes that include triangles, parallelograms, hexagons, pentagons, or combinations of any basic geometric shape or shapes that can be assembled into a tessellation to form an array. This type of image sensor 800 may be advantageously used to generate images of 3D scenes that have large central features. This image sensor 800 may provide production cost advantages because the first image sensor segment 802 requires fewer extensible members to move it parallel to the optical axis of the optical system.

A top plan view of another example image sensor array 900 is shown in FIG. 8. This image sensor array 900 includes a plurality of first image sensor segments 902 that have a smaller surface area than a plurality of second image sensor segments 904. In some embodiments, the image sensor array 900 may include more than two different sizes of image sensor segments. As shown, the first image sensor segments 902 are positioned centrally within the image sensor array 900. In some embodiments, the first image sensor segments 902 may be positioned anywhere within the image sensor array 900, even at the outer edges. In some embodiments, more than one grouping of first image sensor segments 902 may be included. During use, the first image sensor segments 902, when positioned in the center of the image sensor array 900, may be used to capture image data from a 3D scene that includes potentially many objects or details positioned at differing depths of focus. The second image sensor segments 904 are positioned around the first image sensor segments 902 within the image sensor array 900. During use, the second image sensor segments 902 may be used to capture image data from other objects in the 3D scene that are larger or more spread out, even though these other objects may be positioned at different depths of focus. This type of image sensor 900 may be advantageously used to generate images of 3D scenes that have many details with differing depths in central features.

Figure 10:
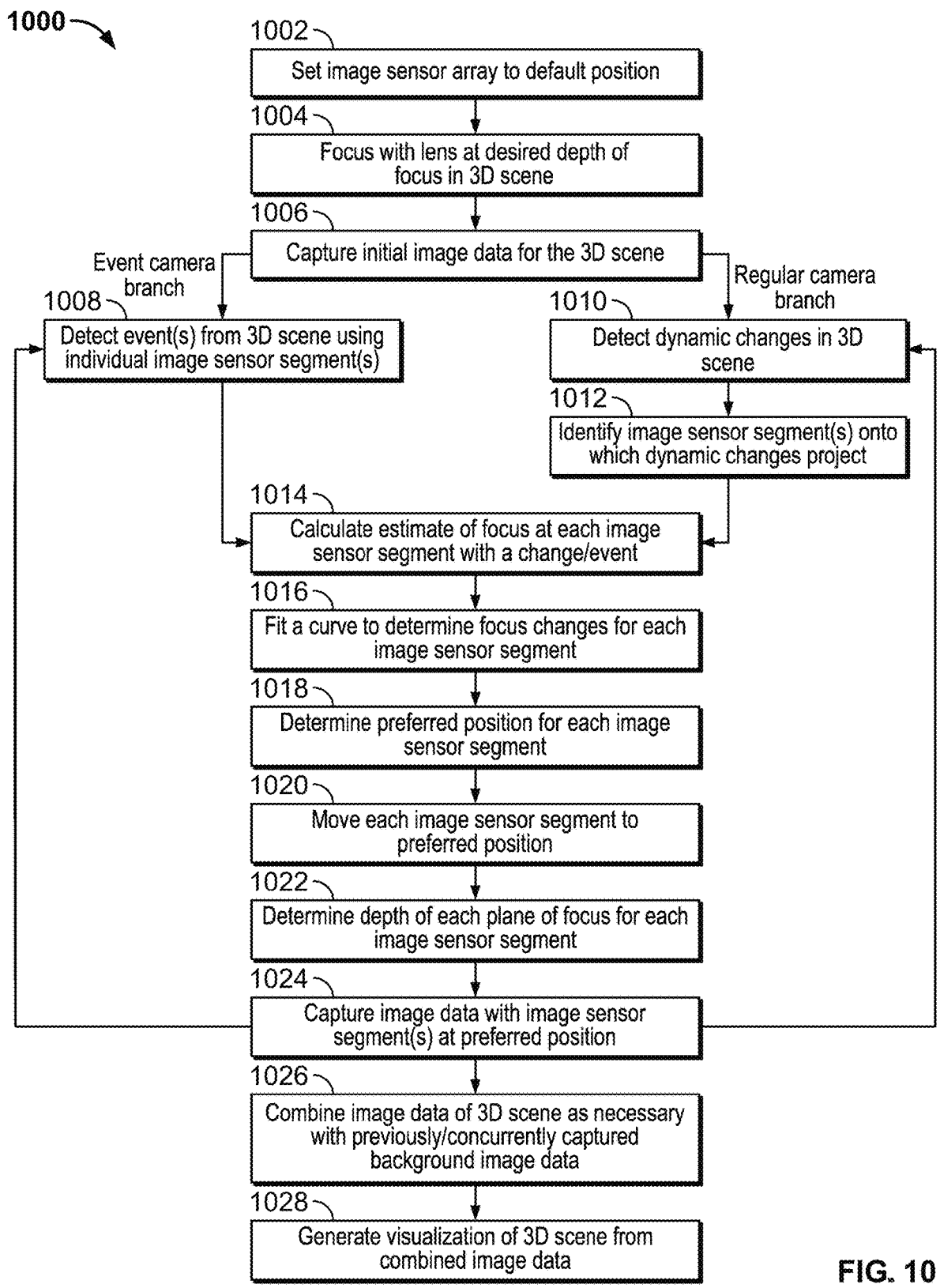
FIG. 10 is a flowchart of illustrative steps involved in use of a camera with an adjustable sensor array.

FIG. 10 shows a flowchart illustrating the steps of a process 1000 for enabling capturing image data from a dynamic 3D scene using a camera with an adjustable image sensor array. The process 1000 may be implemented on the camera 100 of FIG. 1 using any of the image sensor arrays described herein and variations thereof. One or more actions of the process 1000 may be incorporated into or combined with one or more actions of any other process or embodiments described herein. Since dynamic 3D scenes can have wildly different characteristics (lighting, distance from camera, rate of changes occurring in the 3D scene, and the like), it may be desirable to analyze statistical properties of a sample 3D scene, including any dynamic objects that may be present in the 3D scene, so that selection or design of a camera, the image sensory array, and the extensible members are determined to be suitable for the intended use. For example, it may be advantageous to determine the number of image sensor segments included as part of the image sensor array, how the segments are shaped, sized, and distributed.

The process 1000 begins at step 1002 with setting the image sensor array of a camera (whether the camera is a regular camera or an event camera) to a predetermined default position. At step 1004, the focusing lens (or lenses) of the optical system of the camera are moved to have the desired depth of focus for the 3D scene. With the image sensor array set at the default position and the lens focused as desired, at step 1006 an initial image of the 3D scene is captured by the camera. For embodiments in which the camera functions as an event camera, at step 1008 events generated by one or more of the image sensor segments are detected, the events indicating changes in brightness associated with the 3D scene. This is the normal functioning of an event camera. For embodiments in which the camera functions as a regular, traditional digital camera, at step 1010 dynamic changes in the 3D scene are detected, with these dynamic changes indicating changes in the 3D scene. At step 1012, the process detects the image sensor segment(s) onto which the tracked dynamic changes are projected. The remaining portions of the process 1000 may be the same regardless of whether the camera functions as an event camera or as a regular traditional digital camera. At step 1014, a calculation is performed to determine an estimate of focus at each image sensor segment at which a change or event was detected. Methods of estimating focus of objects are known in the art of digital cameras, as are methods of tracking changes in focus as objects dynamically move. At step 1016, a curve is fit to the focus estimates to determine focus changes for each image sensor segment based on dynamic changes in the 3D scene. At step 1018, the preferred position for each image sensor segment is determined based on the fit curve. At step 1020, each image sensor segment is moved to the determined preferred position. At step 1022, the depth of each plane of focus for each image sensor segment is determined. At step 1024, image data is captured with the image sensor segments located at the preferred positions. After step 1024, to continue capturing image data from a dynamic 3D scene, the process 1000 may continue based on the type of camera in use. For event cameras, the process continues by returning to step 1008 until another event is detected. For regular traditional digital cameras, the process continues by returning to step 1010 to detect additional dynamic changes in the 3D scene. Even when the camera continues capturing image data, at step 1026 the captured image data is combined as necessary with previously captured background data or concurrently captured background data. This step 1026 aids in filling in any potential gaps in the image data captured at step 1024, the gaps resulting from differences in positions of adjacent image sensor segments. At step 1028, a visualization of the 3D scene from the combined image data is generated, the visualization being based, as appropriate, on the determined depth of the plane of focus from step 1022. The visualization may be in the form of a 2D/3D image, 2D/3D video, or a 3D reconstruction of the scene.

Embodiments of the above systems and methods may provide distinct advantages that are not found in traditional digital cameras nor in event cameras. In some embodiments, the capability to determine estimates of focus for individual image sensor segments and then move the image sensor segments in response to the estimates of focus enables a camera to bring more precise focus to more objects within a 3D scene. Moreover, the estimates of focus and resulting movements of the image sensor segments enable a camera to simultaneously capture image data for multiple dynamic events in a 3D scene with each of those dynamic events remaining in sharp focus. This effectively creates a much larger depth of field.

In some embodiments, the sizes, shapes, and arrangement of the image sensor segments may be determined based on the expected distribution of objects in a 3D scene. This enables a customization for matching an image sensor array to the specifics of a 3D scene at a level that is previously unavailable. In some embodiments, the sizes of the image sensor segments may be determined based on optimizing a function defined by the accuracy of the focus for different 3D objects within a scene and the electro-mechanical costs of moving the image sensor segments. Larger image sensor segments may reduce the accuracy of the focus of certain types of 3D objects, while smaller image sensor segments may increase the total cost of movement for all the image sensor segments to obtain the best focus for all objects in different planes of focus within a 3D scene. Thus, a combination of these two factors may be considered to determine the sizes of the image sensor segments that are appropriate for a particular use of the camera.

In some embodiments the image sensor array may be constructed to have an imaging surface that can be moved to form an arbitrary 3D surface. The image sensor array shown in FIG. 6 is an example of an image sensor array that may be used to form an arbitrary 3D surface. Such embodiments can help provide additional continuity in the visualizations that are generated form the captured image data.

In some embodiments, additional advantages may be gained by adjusting the focal length of the optical system in combination with adjusting the positions of image sensor segments. By adjusting both the focal length and the positions of the image sensor segments in combination, both mechanical and optical advantages may be realized. The mechanical advantages may come from determining which is more efficient to move, the focal length of the optical system or the positions of the image sensor segments, for capturing image data from different types of 3D scenes. Another advantage is found in being able to determine an optimal focal length to minimize movement of the image sensor segments.

In some embodiments, the trajectory of the image of a dynamic object may be tracked while the image of the object is moving across an image sensor segment. Based on the tracked trajectory, an adjacent image sensor segment onto which the image of the dynamic object is likely to move to next may be determined. The adjacent image sensor segment can then be moved beforehand in anticipation of the image of the dynamic object moving onto the adjacent image sensor segment. This tracking and anticipatory adjustments make it possible, particularly with event cameras, to avoid large and sudden movements of image sensor segments during dynamic changes in the 3D scene.

In some embodiments, the depth to various regions in the static background of a 3D scene may be best determined by focusing on various regions in the background of the 3D scene. By determining the depth to various regions in the static background, a 3D image of the background of a 3D scene may be generated. Just as focusing on dynamic foreground objects helps to generate a depth map of the foreground, focusing on the background regions helps to build up a depth map of the background. By combining the depth maps for different portions of a 3D scene, and particularly for objects within the scene, a more complete depth map of a 3D scene may be generated and maintained while capturing video of the 3D scene.

In some embodiments, background image data may be used to fill in gaps between image sensor segments, the gaps resulting from the differences in positions between adjacent image sensor segments. The background image data may be static image data previously acquired from the 3D scene. For such embodiments, multiple versions of the background image data may be captured to represent different conditions under which the 3D scene is captured using the systems and processes described herein. For example, the background image data may be captured at various times of the day or night, under different lighting conditions, different weather, and the like. Depending on the conditions prevalent at the time the dynamic 3D scene is captured, appropriate background image data may be selected to best match the captured dynamic 3D scene. Such embodiments may best be used in circumstances where the position of the camera is fixed, as the background is then unlikely to be changing.

In some embodiments, the following equations may be used in generating an image of a 3D scene, with one or more objects within the 3D scene, using any of the devices described herein.

$$\text{Depth of Field}(DOF) = (2d^2 cN)/f^2 \tag{1}$$

f: focal length of a lens.
d: distance to a subject.
N: f-stop number for aperture setting.
c: Circle of Confusion, represents "acceptably" sharp focus, e.g., how large a circle can be accepted instead of a point in an image for the focus to still be consider acceptable.

In some embodiments, if $d_o$ is the distance of the lens to an object in 3D, and $d_i$ is the distance of the image from the lens, in some embodiments the following equation is satisfied:

$$1/f = 1/d_o + 1/d_i \tag{2}$$

From equation (2), solving for both $d_o + 1/d_i$:

$$d_i = f\, d_o/(d_o - f) \tag{3}$$

$$d_o = f\, d_i/(d_i - f) \tag{4}$$

If an object is very far away, or $d_o = \infty$, then $d_i = f$. Otherwise, the distance of the image plane from the lens is greater than the focal length of the lens.

In use, there may be K different dynamic objects in a 3D scene that need to be kept in focus simultaneously. This means that the image plane distance from the lens for K different image sensor segments may be represented by: $d_{ij}$, j=1, . . . , K.

It may be advantageous to keep image sensor segments close to each other to minimize large movements of the extensible members. One way to achieve this is by adjusting the focal length f of the lens of the optical system so that the distances of each image sensor segment from the average position of all image sensor segments is minimized. The position of the average position may be calculated as: $Av = (1/K)\Sigma d_{ij}$.

From this, the following expression may be optimized over the range of values of f:

$$\min \sum (d_{ij} - Av)^2 \tag{5}$$

The summations in the above expressions are taken over j=1, . . . , K.

In some embodiments, solving Equation (5) in closed form by differentiating with respect to f and equating to 0 is difficult, since the values of $d_{ij}$ and Av change when f is changed. So, instead, in some embodiments the following numerical solution to this problem may be used.

Algorithm Best-Planes (BP):

In some embodiments, the range of values of f may be discretized into a discrete number of values $f_l$, with l=1, . . . , M, with M being chosen based on the desired amount of precision. With f discretized in this manner, the following algorithmic process may be used:

```
Initially set Best_f = f₁; Min = +∞
For each value of l = 1 ... M:
    Compute d_oj and d_ij, for j = 1, ..., K;
```

The object distances from the lens will change as the focal length of a lens changes. When f changes, $d_{oj}$ is first computed. This can be done as new object distances can be computed based on changes in f, and the earlier object distance before changing f. Following this, $d_{ij}$ can be computed based on Equation (3).

```
Compute Av;
Compute Current_Min = Σ (d_ij − Av)²;
If the calculated Current_Min < Min, then:
    Set Min to Current_Min; and Set Best_f to f₁;
```

Once this algorithm resolves without the last conditional comparison being true, then the output is the current value of Best_f.

Note that the above algorithm may be modified to solve for best locations of image sensor segments considering different constraints. For example, in some embodiments the delta values might be minimized between neighboring image sensor segments so as to minimize image discontinuity. This could be achieved by minimizing $\Sigma(d_{ij}-d_{i+1j})^2$ instead of $\Sigma(d_{ij}-Av)^2$ in the algorithm above.

In some embodiments, it may be beneficial to consider the design of the camera prior to capturing a 3D scene, particularly the design of the image sensor array and the number and shapes of the image sensor segments forming the image sensor array. A rectangular image sensor array, with all image sensor segments being rectangular and identical in all aspects, may be an appropriate starting point for determining if there are other configurations that would best capture a 3D scene. For such an image sensor array, if the resolution in pixels is expressed by W×H for the entire image sensor array, and if the image sensor array has C as the number of columns and R as the number of rows of image sensor segments, then the number of image sensor segments in the image sensor array is C×R, and the resolution of each image sensor segment is expressed as (W/C)×(H/R). For a given image sensor array size, if the image sensor segments are smaller, meaning there are a greater number of image sensor segments, then the image sensor array would be able to focus on a greater number of small objects within a 3D scene. Conversely, if the image sensor segments are larger, such that there are fewer image sensor segments, then the image sensor array would be able to focus on fewer individual small objects within the same 3D scene. This would result in multiple objects being projected onto the same image sensor segment, potentially leaving some of those objects out of sharp focus. Taking this into consideration, the focus criteria function may be expressed based on the image sensor segment size as follows:

$$Focus\,(C, R) = A\,(CR)^{\alpha}, \text{ where } A > 0 \text{ and } \alpha \geq 0 \text{ and all are constants.} \quad (8)$$

As another point of comparison, image sensor arrays with greater numbers of image sensor segments may result in greater manufacturing costs, greater power consumption during use, and potentially a slower response to changes in the 3D scene during operation. Focusing solely on the response time, a response criteria function may be expressed as follows:

$$Response\,(C,R)=B(CR)^{-\beta}, \text{ where } B > 0 \text{ and } \beta \geq 0 \text{ and both are constants.}$$

By combining the focus and response criteria functions, a function for determining the optimal size for the image sensor segments may be defined as:

$$Opt\,(C, R) = A\,(CR)^{\alpha} + B\,(CR)^{-\beta}, \text{ where } A, \quad (6)$$
$$B > 0 \text{ and } \alpha, \beta \geq 0 \text{ and all are constants.}$$

Since this is a simplified function that only depends on the total number of image sensor segments, Equation (6) can be simplified to:

$$Opt\,(x) = x^{\alpha} + \lambda\,x^{-\beta}, \text{ where } \lambda > 0 \text{ and } \alpha, \beta \geq 0 \text{ and all are constants.} \quad (7)$$

In some embodiments, the optimization for determining the number and size of image sensor segments could be determined by a neural network and machine learning, assuming that data can be collected on a sufficiently large number of 3D scenes with a variety of alternative camera designs and tested on human subjects to measure perceptual feedback.

The processes and systems described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A camera comprising:
    an optical system configured to generate an image of a 3D scene;
    an image sensor array comprising a plurality of image sensor segments, the image sensor array positioned to receive the image of the 3D scene; and
    a plurality of extensible members, each extensible member coupled between a housing and an image sensor segment of the plurality of image sensor segments, and each extensible member configured to move a respective image sensor segment parallel to an optical axis of the optical system.

2. The camera of claim 1, wherein each extensible member is further configured to move the respectively coupled image sensor segment in tilt.

3. The camera of claim 1, wherein each extensible member is configured to move the respectively coupled image sensor segment independently of other image sensor segments.

4. The camera of claim 1, wherein the image sensor array is configured as an event sensor.

5. The camera of claim 1, wherein the image sensor segments are greater in number as compared to the extensible members.

6. The camera of claim 1, wherein each image sensor segment comprises an image sensor and a backplane, the image sensor coupled to the backplane.

7. The camera of claim 6, wherein the backplane of each image sensor segment is coupled to a flexible support surface.

8. The camera of claim 6, wherein the backplane of each image sensor segment is elastically coupled to the backplane of each adjacent image sensor segment.

9. The camera of claim 1, wherein each image sensor segment comprises a first image sensor coupled to a first backplane and a second image sensor coupled to a second backplane, the first backplane coupled to one of the extensible members, and the second image sensor disposed between the first backplane and the second backplane.

10. The camera of claim 1, wherein the plurality of image sensor segments comprises a first image sensor segment having a first geometrical shape and a second image sensor segment having a second geometrical shape, the first geometrical shape being different from the second geometrical shape.

11. The camera of claim 1, wherein the plurality of image sensor segments comprises a first image sensor segment and a second image sensor segment, the first image sensor segment having a larger surface area as compared to the second image sensor segment.

12. The camera of claim 1, further comprising:
control circuitry operably coupled to the image sensor segments and to the extensible members, the control circuitry configured to control movement of the extensible members and to process image data generated by the image sensor segments; and
storage operably coupled to the control circuitry.

13. The camera of claim 12, wherein the control circuitry is further configured to analyze the image data generated by the image sensor segments, and to control movement of one or more of the extensible members based on the analyzed image data.

14. The camera of claim 12, wherein the control circuitry is further configured to analyze the image data to determine an estimate of focus for each image sensor segment.

15. The camera of claim 14, wherein the control circuitry is further configured to control movement of one or more of the extensible members based on the determined estimate of focus for each respectively associated image sensor segment.

16. The camera of claim 12, wherein the control circuitry is further configured to generate a 3D visualization of the 3D scene based on the image data.

17. The camera of claim 12, wherein the image sensor array is configured as an event sensor, and the image data comprises event data generated by the image sensor segments, and the control circuitry is further configured to analyze the event data.

18. The camera of claim 1, wherein the optical system comprises at least one lens configured to be adjusted to change a focal length of the optical system.

19. A method comprising:
generating, using an optical system, an image of a 3D scene at an image sensor array comprising a plurality of image sensor segments;
capturing, using control circuitry, image data generated by a first image sensor segment of the plurality of image sensor segments;
analyzing, using the control circuitry, the image data captured from the first image sensor segment of the plurality of image sensor segments; and
moving, based on the analyzed image data, the first image sensor segment parallel to an optical axis of the optical system from a first position to a second position, wherein the second position is different from the first position.

20. The method of claim 19, wherein analyzing the image data comprises analyzing the image data for an estimate of focus.

* * * * *